United States Patent [19]
Adachi et al.
[11] 4,305,863
[45] Dec. 15, 1981

[54] GLASS BEAD-FILLED RESIN COMPOSITION

[75] Inventors: Tuneyuki Adachi, Nara; Shioji Mizuno, Osaka, both of Japan
[73] Assignee: Dainippon Ink & Chemicals, Inc., Tokyo, Japan

[21] Appl. No.: 158,377
[22] Filed: Jun. 11, 1980
[30] Foreign Application Priority Data
Jun. 15, 1979 [JP] Japan ..................... 54-74645
[51] Int. Cl.[3] ..................... C08L 75/06
[52] U.S. Cl. ..................... 260/40 TN
[58] Field of Search ..................... 260/40 TN, 37 N

[56] References Cited

U.S. PATENT DOCUMENTS 3,290,165 12/1966 Iannicelli ..................... 106/308
3,391,054 7/1968 Lewis et al. ..................... 260/40 TN
4,022,752 5/1977 Horn et al. ..................... 260/45.75 B
4,100,114 7/1978 Naka et al. ..................... 260/37 N
4,216,136 8/1980 Stayner ..................... 260/37 N

FOREIGN PATENT DOCUMENTS 52-28598 3/1977 Japan .

*Primary Examiner*—Lewis T. Jacobs
*Attorney, Agent, or Firm*—Sherman & Shalloway

[57] ABSTRACT

A glass bead-filled resin composition comprising (I) a thermoplastic polyurethane derived from polybutylene terephthalate and a polyfunctional isocyanate, (II) glass beads having a diameter of not more than 100 microns, and (III) an aminosilane or epoxysilane. The above composition can be prepared by kneading under heat (I) a thermoplastic polyurethane derived from polybutylene terephthalate and a polyfunctional isocyanate, and (II) glass beads having a diameter of not more than 100 microns and coated with (III) an aminosilane or epoxysilane.

9 Claims, No Drawings

GLASS BEAD-FILLED RESIN COMPOSITION

This invention relates to a glass bead-filled resin composition having high mechanical strength and heat resistance and excellent dimensional stability with extremely reduced deformation during molding.

Polybutylene terephthalate (PBT for short) obtained by condensing terephthalic acid or its ester with 1,4-butanediol is a crystalline thermoplastic polymer, and has low water absorption and superior mechanical properties, thermal properties, electrical properties and chemical resistance. For this reason, PBT is gaining much acceptance in the field of molding materials as a resin which is equivalent to, or better than, polyacetal or nylon. Glass fiber-reinforced PBT obtained by incorporating glass fibers having a length (L) to dimeter (D) ratio (L/D) of higher than about 30 into PBT has very much increased mechanical strength and heat stability, and therefore, can be used as substitutes for metals in the field of thin plate working and die casting. However, during injection molding of this glass fiber-reinforced PBT, the glass fibers are oriented in the flowing direction of the resin in the molded article. Hence, the shrinkage of the molded article is anisotropic. Thus, the glass fiber-reinforced PBT has the defect that "deformation" or "warpage" occurs, or the glass fibers rise to the surface of the molded article so that the surface becomes non-smooth and roughened.

It is generally said that to achieve mechanical strength and heat stability in molded articles prepared from such glass fiber-reinforced PBT, the glass fibers contained in the molded articles should have an L/D ratio of more than about 30. On the other hand, to remove anisotropy and deformation from the molded articles, glass fibers having a low L/D ratio, and ultimately bead-like glass fibers having an L/D of 1, are desired. Certainly, inclusion of such glass fibers into PBT will remove deformation of molded articles, but their strength is reduced. In some cases, the molded articles will be broken only by a small force required to release the molded articles from the molds after the molding operation.

Addition of glass beads coated with a silane coupling agent to PBT, too, cannot bring about a sufficient improvement in the brittleness of the composition.

It has been desired therefore to develop glass bead-filled resin composition having superior mechanical strength and heat stability and being free from deformation, warpage, and surface roughning.

It is an object of this invention to provide a glass bead-filled resin composition capable of meeting this desire.

The present inventors have found that a resin composition obtained by incorporating glass beads having a diameter of not more than 100 microns and a specified silane into a certain thermoplastic polyurethane derived from PBT achieves the object of this invention.

Thus, according to this invention, there are provided a glass bead-filled thermoplastic resin composition comprising (I) a thermoplastic polyurethane derived from PBT, preferably hydroxyl-terminated PBT having an intrinsic viscosity [$\eta$] of 0.2 to 0.6, (II) glass beads having a diameter of not more than 100 microns, and (III) an aminosilane or epoxysilane, and a molded article produced from this glass bead-filled thermoplastic resin composition.

The present inventors thought that glass beads having a diameter of not more than 100 microns are desirable for removing deformation in molded articles, and for increasing their strength and heat resistance. As a result of various investigations based on this thought, the present inventors used in this invention glass beads which have high reactivity with silane-type coupling agents and good adhesion to resins.

The PBT-based polyurethane in accordance with this invention has very good adhesion to glass beads. When a specified silane coupling agent is added to a mixture of the polyurethane and the glass beads, the coupling agent is bonded firmly to the glass beads, and moreover, the amino or epoxy groups of the coupling agent react with the urethane groups of the polyurethane so that ultimately, the polyurethane is bonded very firmly to the glass beads through the coupling agent. Although no practical strength can be obtained by simply filling glass beads in PBT-based polyurethane, the addition of a specified coupling agent in this case gives a resin composition having high mechanical strength and heat resistance and very much reduced deformation, which can give molded articles having very high utilitarian value.

It is further noteworthy that the present invention has the following secondary characteristics. Firstly, since glass beads are used, there can be obtained molded articles having a smooth and lusterous surface which are close to those prepared from a resin alone and cannot be obtained from glass fiber-reinforced resins. Secondly, the molded articles have superior coatability. Specifically, coated films of polyurethane paints or epoxy resin paints have high adhesion to the resulting molded articles. Furthermore, when an alkyd melamine or acrylic/melamine paint of the baking type is coated on the molded article and baked at 150° C. for 30 minutes, deformation of the molded articles is only slight. The adhesion strength of the coated film of such a baking type paint is 100/100 (eleven lines are provided at intervals of 1 mm lengthwise and crosswise in the coated film to provide 100 square sections; a Cellophane tape is adhered closely to the cut surface and then peeled off; the number of the square sections which remained is shown against the total number of square sections). Thirdly, although the strength of a weld part of a molded article of PBT reinforced with glass fibers having a high L/D ratio is as low as one-second of that of the other parts of the molded article, no decrease in the strength of a weld part is noted in molded articles prepared from the composition of this invention.

PBT as one starting material of the thermoplastic polyurethane (I) is low-molecular-weight PBT having an active hydrogen atom at its both ends which is obtained by condensation reaction between terephthalic acid or an alkyl ($C_1$-$C_4$) terephthalate and 1,4-butanediol. Preferably, PBT has an intrinsic viscosity [$\eta$] of 0.2 to 0.6. The hydroxyl value (the number of milligrams of KOH which is equivalent to the hydroxyl groups per gram of the sample) is preferably 9 to 37, especially preferably 11 to 28. PBT whose terminal groups consist solely of hydroxyl groups is preferred. However, some of the terminal groups may be converted to carboxyl groups, in which case the acid value (the number of milligrams of KOH which reacts with carboxyl groups per gram of the sample) of the PBT is desirably not more than 10, and is not more than one-third of its hydroxyl value. As the molecular weight of PBT is lower, the number of urethane groups in the polyurethane becomes larger, and the adhesion of the resin to glass increases. However, in such a case, the heat stability of the urethane linkages is low, and the reinforced product tends to undergo heat decomposition during the molding operation. Consequently, the properties of the molded product tend to be degraded, or the molded product tends to be colored yellow. On the other hand, when the molecular weight of PBT becomes too high, the resulting polyurethane necessarily has a small amount of urethane linkages, and its adhesion to glass is reduced. Thus, a molded article having practical strength cannot be obtained.

The intrinsic viscosity [η], as referred to in the present invention, is determined by dissolving 0.1 g, 0.25 g, and 1.0 g, respectively, of PBT in 25 ml of a 6:4 (by weight) mixture of phenol and tetrachloroethane, and measuring the relative viscosity of each of the solutions at 30° C. in a customary manner.

Copolymers obtained by replacing less than 50% by weight of the acid component and/or alcohol component of the PBT, and copolymerizing the resulting components can also be used in this invention instead of PBT. Examples of such copolymer components are isophthalic acid, adipic acid, ethylene glycol, propylene glycol, 1,2- or 1,3-butanediol, and 1,6-hexanediol.

The polyfunctional isocyanate as the other starting material for the thermoplastic polyurethane (I) is a polyisocyanate containing at least two isocyanate groups in the molecule, and preferably a diisocyanate of the general formula $$OCN—R—NCO$$

wherein R represents a divalent aromatic, aliphatic or alicyclic radical.

Specific examples of the polyfunctional isocyanate include aliphatic diisocyanates such as tetramethylene diisocyanate and hexamethylene diisocyanate; aromatic diisocyanate such as 2,4-tolylene diisocyanate, 2,6-tolylene diisocyanate, 4,4'-diphenylmethane diisocyanate, m-phenylene diisocyanate, p-phenylene diisocyanate, and 1,5-naphthalene diisocyanate; and alicyclic diisocyanates such as dicyclohexylmethane diisocyanate. Crude diphenylmethane diisocyanate, a dimer of tolylene diisocyanate, a dimer of 4,4'-diphenylmethane diisocyanate, and isocyanurate compounds can also be used.

In the production of the thermoplastic plyurethane (I), the ratio between PBT and the polyisocyanate is desirably such that the number of functional groups is substantially the same for both ingredients. In some cases, they may be used in such a ratio that the number of isocyanate groups is within the range of 0.8 to 1.5 per active hydrogen atom of PBT.

PBT of the desirdd molecular weight can be produced, for example, by ester interchange reaction of dimethyl terephthalate and a molar excess, based on the dimethyl terephthalate, of 1,4-butanediol in the presence of a catalyst at 130° to 260° C., followed by condensation under reduced pressure. The hydroxyl value of the resulting PBT can be easily determined by reacting the terminal hydroxyl groups with succinic anhydride, and determining the resulting carboxyl groups, as disclosed, for example, in Makromolekulare Chem. 17, 219-230 (1956).

The thermoplastic polyurethane (I) can be obtained by a known method. For example, it can be produced by melting PBT at 240° C. in a reaction kettle for high-viscosity resins, adding an equivalent weight of 4,4'-diphenylmethane diisocyanate to react it with PBT, taking out the reaction product from the kettle 5 minutes after the viscosity of the resin rises abruptly, cooling the reaction product and pelletizing it. Because the melt viscosity of polyurethane (I) is much higher than that of PBT, a special reaction kettle for high-viscosity resins is required. In some cases, a continuous reaction apparatus for high-viscosity resins, such as a twin-screw extruder, can be advantageously used.

Generally, in the production of ordinary polyurethanes, a chain extruder such as 1,4-butanediol is used. In the present invention, however, the use of a chain extender leads to the necessity of using an increased amount of the polyisocyanate, and this may drastically change the properties of the final resin composition. For this reason, the amount of a chain extender, if used, should be not more than 10% based on PBT. Suitable chain extenders are 1,4-butanediol and bishydroxyethyl terephthalate.

The glass beads used in this invention are described below. Use of glass beads having no directionality is essential in removing deformation of the molded articles. Suitable glass beads have a diameter of not more than 100 microns and are of a directionality-free shape which is spherical or nearly spherical. If the diameter of the glass beads exceeds 100 microns, the glass beads cannot be uniformly dispersed in the resin component, and the glass beads may overlap one another, thus causing a decrease in strength. Furthermore, the surface finish of the molded articles is poor, and their merchandise value is lost. Moreover, the flowability of the resin composition during molding in a mold decreases. Preferably, the glass beads have a diameter of 5 to 70 microns. In general, an assembly of glass beads having a particle diameter distribution in the range of 10 to 40 microns is frequently used.

Preferably, the glass beads (II) of this invention are coated with an aminosilane or epoxysilane. They are produced by treating the glass beads of the aforesaid dimension with the aminosilane or epoxysilane. Preferred aminosilanes or epoxysilanes are liquid compounds of the general formula $$R_1—SI—X$$

wherein $R_1$ represents a group having at least one amino or epoxy group, and X represents a hydroxyl group or a group capable of forming a hydroxyl group upon reaction with water, such an alkoxy group or halogenoxy group.

Examples of the aminosilanes are γ-aminopropyltriethoxy silane, N-β-(aminoethyl)-γ-aminopropyltrimethoxy silane, γ-ureidopropyltriethoxy silane, and N-β-(aminoethyl)-γ-aminopropyldimethoxymethyl silane. Examples of the epoxysilanes are γ-glycidoxypropyltrimethoxy silane, γ-glycidoxypropyltriethoxy silane, and β-(3,4-epoxycyclohexyl)ethyltrimethoxy silane.

The suitable amount of the aminosilane or epoxysilane is 0.001 to 3% by weight, preferably 0.002 1% by weight, based on the weight of the glass beads, in view of the properties of the resulting composition and the cost of production. The increase of the strength of the composition is affected greatly by the amount of the coupling agent, i.e. the aminosilane or epoxysilane. Accordingly, the amount of the coupling agent is an important factor in the present invention.

The aminosilanes or epoxysilanes are described, for example, in British Pat. No. 1,069,752 and "SPI," 27th, 21-A.C.D.

The aminosilane or epoxysilane can be conveniently handled in the following manner.

The aminosilane or epoxysilane as a coupling agent is generally liquid, and since its amount to be used is small, it is applied to the glass beads from its solution in water in a certain concentration. Coating of the glass beads can be performed, for example, by applying the solution to the glass beads, and heating the glass beads at atmospheric pressure or under vacuum to remove water.

Another method may be the one comprising adding the coupling agent while mixing the polyurethane with the glass beads.

The glass fiber reinforced thermoplastic resin composition of this invention consists of 100 parts by weight of the thermoplastic polyurethane (I) and 10 to 200 parts, preferably 30 to 150 parts by weight, of the glass beads (II). The mechanical strength and thermal stability of the composition have to do with the amount of the glass beads (II), and generally become higher as the amount of the glass beads is larger. If the amount of the glass beads (II) is less than 10 parts by weight, the desired effect cannot be achieved. On the other hand, when its amount exceeds 200 parts by weight, the resulting glass bead-containing resin composition is difficult to mold by an injection molding technique, and the glass beads rise to the surface of the molded article to present a roughened non-lusterous surface. The most suitable amount of the glass beads (II) is 35 to 120 parts by weight per 100 parts by weight of the thermoplastic polyurethane (I).

The thermoplastic polyurethane (I) and the glass beads (II) are mixed in a customary manner. For example, by mixing them continuously in an extruder, pellets of uniform properties can be obtained with good productivity. Both a single-screw and a twin-screw extruder can be used, but the latter is preferred because of its better productivity. Generally, a suitable mode of mixing is to mix them at a temperature of 210° to 260° C. for a period of 0.2 to 20 minutes. Alternatively, a method is also applicable which comprises dispersing the glass beads (II) in a system in which the thermoplastic polyurethane (I) is being produced. This method has much higher productivity since it can be performed in a single step. Specifically, a mixture of low-molecular-weight PBT, the polyisocyanate, glass beads and the coupling agent or a mixture of low-molecular-weight PBT, the polyisocyanate and glass beads coated with the coupling agent is first prepared, and then the mixture is fed into a twin-screw extruder to perform a urethanization reaction at a temperature of 210° to 260° C. for 1 to 20 minutes thereby to produce the thermoplastic polyurethane (I) and simultaneously to disperse the coated glass fibers (II) therein.

In the present invention, less than 50% by weight of the thermoplastic polyurethane (I) can be replaced by another polymer. Examples of such a polymer include polyethylene, polypropylene, an ethylene/vinyl acetate copolymer, an ethylene/acrylate copolymer, an ethylene/propylene copolymer, polystyrene, AS resin, ABS resin, polyamides, polyacetal, polycarbonate, polyethylene terephthalate, polyphenylene oxide, polyvinyl chloride, chlorinated polyethylene, and thermoplastic polyurethanes other than the thermoplastic polyurethane (I) used in this invention.

In order to improve mechanical properties and adhesion, 0.01 to 10% by weight, based on the weight of the thermoplastic polyurethane, of an epoxy compound may be incorporated in the composition of this invention. Epoxy compounds which are liquid and have at least two epoxy groups in the molecule are preferred for this purpose.

The polyepoxides may be saturated or unsaturated, aliphatic, cycloaliphatic, aromatic or heterocyclic and may be substituted if desired with non-interfering substituents. The polyepoxides may be monomeric or polymeric.

The monomeric-type polyepoxide compounds may include the following: vinyl cyclohexene dioxide epoxidized soyabean oil, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4-bis(2-hydroxy-4,5-epoxypentoxy)benzene, 1,2,5,6-diepoxy-3-hexyne, 1,2,5,6-diepoxyhexane, 1,2,3,4-tetra(2-hydroxy-3,4-epoxybutoxy)butane, and epoxy-substituted materials obtained by reacting diisocyanates with glycidol, 2,2-bis(2,3-epoxypropoxyphenyl)propane.

Examples of the polymeric-type polyepoxides include polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

Likewise, 0.01 to 10% by weight, based on the thermoplastic polyurethane, of a polyfunctional compound such as polycarboxylic acid anhydrides may be incorporated in the composition of this invention.

Examples of the polycarboxylic acid anhydrides are pyromellitic anhydride, naphthalenetetracarboxylic dianhydride and 3,3',4,4'-bisphenyltetracarboxylic dianhydride.

If desired, the composition of this invention may further contain other reinforcing materials (e.g., calcium sulfate, talc, calcium metasilicate, quartz powder, clay, mica, calcium silicate and glass fibers), pigments, dyes, plasticizers, mold releasing agents, lubricant agents, heat stabilizers, antioxidants, ultraviolet absorbers, blowing agents, fire retardants, etc.

Mica is especially preferred because it is conducive to improvement of the mechanical strength of the resin composition. The amount of mica is not more than 30% by weight, preferably 0.5 to 20% by weight, based on the total weight of the composition.

The following examples further illustrate the present invention specifically. In these examples, parts are by weight.

SYNTHESIS EXAMPLE 1 (SYNTHESIS OF PBT-1)

A reaction vessel was charged with 194 parts of dimethyl terepythalate and 135 parts of 1,4-butanediol. They were heated to 150° C. to form a uniform solution. While the solution was stirred under a nitrogen stream, 0.04 part of tetraisopropyl titanate as a catalyst was added. Soon, ester interchange began, and by-product methanol began to distill out. The temperature of the system was gradually raised, and when the temperature rose to about 220° C. at which the distillation of methanol almost stopped, the system was gradually evacuated, and condensation was allowed to proceed. After maintaining the reaction mixture at 250° C. and 10 mmHg for 2 hours, the reaction was stopped, and the resulting resin was taken out. The resulting PBT had an intrinsic viscosity [$\eta$] of 0.38, a hydroxyl value of 17.5 and an acid value of 0;45. The product is designated as PBT-1.

SYNTHESIS EXAMPLE 2 (SYNTHESIS OF PBT-2)

By operating in the same way as in Synthesis Example 1 except that the condensation reaction time was prolonged, PBT was obtained which had an intrinsic viscosity [$\eta$] of 0.45, a hydroxyl value of 10.5 and an acid value of 0.72. The product was designated as PBT-2.

SYNTHESIS EXAMPLE 3 (SYNTHESIS OF PBT-3)

By operating in the same way as in Synthesis Example 1 except that the degree of vacuum at the time of condensation was adjusted to 0.5 mmHg, high-molecular-weight PBT having an intrinsic viscosity [$\eta$] of 1.0 was obtained. The product was designated as PBT-3.

SYNTHESIS EXAMPLE 4 (SYNTHESIS OF POLYURETHANE-1)

One hundred parts of PBT-1 was placed in a reaction kettle for high-viscosity resins, and dissolved at 240° C. under a nitrogen stream. With stirring, 5.6 parts of 4,4'-diphenylmethane diisocyanate was placed into the reactor, whereupon the reaction proceeded rapidly and the viscosity of the resin increased. Five minutes later, the resin was taken out of the reaction kettle. The resulting resin had an intrinsic viscosity [$\eta$] of 1.0. The product is designated as polyurethane-1.

EXAMPLE 1

PBT-1 obtained in Synthesis Example 1 (56.7 parts), 3.3 parts of 4,4'-diphenylmethane diisocyanate (abbreviated MDI hereinafter) and 40 parts of glass beads having a diameter distribution in the range of 5 to 60 microns and treated with 0.005% by weight of $\gamma$-glycidoxypropyl trimethoxysilane were uniformly mixed in a tumbler-type mixer. The mixture was fed into a vent-equipped extruder heated at 250° C. and having two 50 mm screws adapted for rotation in the same direction, and heated and kneaded to form pellets. The residence time of the mixture in the cylinders of the extruder was adjusted to 1 minute. The pellets were molded by a 3-ounce injection molding machine to prepare test pieces for determination of properties and a circular sheet having a thickness of 1.6 mm and a diameter of 100 mm (a side gate is the only gate).

The polyurethane had an intrinsic viscosity [$\eta$] of 0.9. The molded product had a tensile strength (TS for short) of 530 kg/cm$^2$, a tensile elongation (TE for short) of 6%, a flexural strength (FS for short) of 980 kg/cm$^2$, a flexural modulus (FM for short) of $4\times10^4$ kg/cm$^2$ and an unnotched Izod impact strength (II for short) of 40 kg·cm/cm. The circular sheet was quite free from warpage and showed a smooth finish. The shrinkage of the polymer during molding was 1.3% both in the flowing direction of the polymer and in a direction at right angles to it, thus showing no anisotropy.

COMPARATIVE EXAMPLE 1

Test pieces and a circular sheet were prepared in the same way as in Example 1 except that the glass beads used were not treated with the silane coupling agent.

The circular sheet was free from deformation, and showed a smooth finish. The test pieces had a TS of 400 kg/cm$^2$, a TE of 6% and an II of 16 kg·cm/cm and were very fragile. The properties are shown in Table 1.

COMPARATIVE EXAMPLE 2

Test pieces and a circular sheet were prepared in the same way as in Example 1 except that PBT-3 was used instead of the PBT-1. The test pieces were very fragile with a TS of 360 kg/cm$^2$, a TE of 0.8% and an II of 20 kg·cm/cm. The properties are shown in Table 1.

EXAMPLE 2

Test pieces and a circular sheet were prepared in the same way as in Example 1 except that the amount of PBT-1 was changed to 65 parts, the amount of MDI to 5 parts and the amount of the aminosilane-treated glass beads to 30 parts. The circular sheet was free from deformation and warpage, and showed a smooth finish. The test pieces had a TS of 520 kg/cm$^2$, a TE of 9% and an II of 34 kg·cm/cm. The properties are shown in Table 1.

COMPARATIVE EXAMPLE 3

Test pieces and a circular sheet were prepared in the same way as in Example 2 except that a chopped strand of glass fibers having a diameter of 13 microns and a length of 6 mm and treated with an aminosilane coupling agent was used instead of the glass beads. The test pieces had a TS of 1350 kg/cm$^2$ and an II of 70 kg·cm/cm. However, the circular sheet had extremely large deformation and warpage. The shrinkage of the polymer at the time of molding was 0.3% in the flowing direction of the resin, and 1.3% in a direction at right angles to it, thus showing large anisotropy. The surface finish of the molded article was rough. The properties are shown in Table 1.

EXAMPLES 4 AND 5

Example 2 was repeated except that the amount of the glass beads and the type of PBT were changed as shown in Table 1. Molded articles which were tough and free from anisotropy and deformation and had a good surface finish were obtained. The properties are shown in Table 1.

EXAMPLE 6

Test pieces and a circular sheet were prepared in the same way as in Example 1 except that 0.5 part of an epoxy resin (Epiclon 850; a product of Dainippon Ink and Chemicals, Inc.) was further added in preparing the resin composition.

The test pieces had a TS of 650 kg/cm$^2$, a TE of 7.5%, an FS of 1100 kg/cm$^2$, an FM of $4.1\times10^4$ kg/cm$^2$ and an II of 49 kg·cm/cm. The circular sheet was quite free from deformation and warpage. The properties are shown in Table 1.

EXAMPLE 7

Test pieces and a circular sheet were prepared in the same way as in Example 1 except that the amount of PBT-1 was changed to 53 parts, and 7 parts of an epoxy resin (Epiclon 850) was further added. The test pieces had a TS of 720 kg/cm$^2$, a TE of 7.0%, an FS of 1230 kg/cm$^2$, an FM of $4\times10^4$ kg/cm$^2$ and an II of 46 kg·cm/cm. The surface finish and deformation of the circular sheet and the molding shrinkage are shown in Table 1.

EXAMPLE 8

Test pieces and a circular sheet were prepared in the same way as in Example 1 except that the amount of the glass beads was changed to 30 parts and 10 parts of mica powder (Suzorite Mica 200S, a trademark for a product of Marietta Resources, U.S.A.). The test pieces had a TS of 700 kg/cm$^2$, a TE of 7%, an FS of 1230 kg/cm$^2$, an FM of $4.6\times10^4$ kg/cm$^2$ and an II of 40 kg/cm$^2$. The surface finish and deformation of the circular sheet and the molding shrinkage are shown in Table 1.

EXAMPLE 9

Test pieces and a circular sheet were prepared in the same way as in Example 8 except that the amount of the glass beads was changed to 19 parts, the amount of the mica powder was changed to 20 parts and 1 part of the same epoxy resin as used in Example 6 was further added. The test pieces had a TS of 870 kg/cm$^2$, a TE of 6.0%, an FS of 1530 kg/cm$^2$, an FM of 5.8 kg/cm$^2$, and an II of 40 kg/cm$^2$. The surface finish and deformation of the circular sheet and the molding shrinkage are shown in Table 1.

TABLE 1

| Example (Ex.) or Comparative Example (CEx.) | PBT (parts) | MDI (parts) | Glass beads Amount (parts) | Glass beads Coupling agent | Glass beads Amount of the coupling agent (%wt.) | Amount of epoxy resine (parts) | Amount of mica (parts) | [η] |
|---|---|---|---|---|---|---|---|---|
| Ex. 1 | PBT-1 56.7 | 3.3 | 40 | Epoxy-silane | 0.005 | — | — | 0.9 |
| CEx. 1 | PBT-1 56.7 | " | " | — | — | — | — | 0.9 |
| CEx. 2 | PBT-3 60 | — | " | Epoxy-silane | 0.005 | — | — | — |
| Ex. 2 | PBT-1 65 | 5 | 30 | Amino-silane | 0.01 | — | — | 1.0 |
| CEx. 3 | PBT-1 65 | " | (Glass-fiber 30) | Amino silane | " | — | — | — |
| Ex. 4 | Polyure-thane-1 50 | — | 50 | Amino-silane | " | — | — | — |
| Ex. 5 | PBT-2 77 | 3 | 20 | Amino-silane | " | — | — | 1.1 |
| Ex. 6 | PBT-1 56.2 | 3.3 | 40 | Epoxy-silane | 0.005 | 0.5 | — | 0.95 |
| Ex. 7 | Polyure-thane-1 53 | — | " | Epoxy-silane | " | 7.0 | — | 0.95 |
| Ex. 8 | PBT-1 56.7 | 3.3 | 30 | Epoxy-silane | " | — | 10.0 | 0.90 |
| Ex. 9 | PBT-1 56.7 | " | 19 | Epoxy-silane | " | 1.0 | 20.0 | — |

| Example (Ex.) or Comparative Example (CEx.) | TS (kg/cm$^2$) | TE (%) | FS (kg/cm$^2$) | FM (kg/cm$^2$) | Un-notched II (kg . cm/cm) | Surface finish of the modded article | Deformation of the circular sheet | Molding shrinkage (flow direction/perpendicular direction (%) |
|---|---|---|---|---|---|---|---|---|
| Ex. 1 | 530 | 6 | 980 | $4\times10^4$ | 40 | Smooth | None | 1.3/1.3 |
| CEx. 1 | 400 | 1.0 | 670 | $3.8\times10^4$ | 16 | " | " | 1.3/1.3 |
| CEx. 2 | 360 | 0.8 | 720 | $3.9\times10^4$ | 20 | " | " | 1.4/1.4 |
| Ex. 2 | 520 | 9 | 950 | $4\times10^4$ | 34 | " | " | 1.5/1.5 |
| CEx. 3 | 1350 | 2.5 | 1800 | $9\times10^4$ | 70 | Rough | Large | 0.3/1.3 |
| Ex. 4 | 600 | 4.5 | 1030 | $5\times10^4$ | 52 | Smooth | None | 1.2/1.2 |
| Ex. 5 | 530 | 1 8 | 950 | $3.2\times10^4$ | 37 | " | " | 1.7/1.7 |
| Ex. 6 | 650 | 7.5 | 1100 | $4\times10^4$ | 49 | " | " | 1.3/1.3 |
| Ex. 7 | 720 | 7.0 | 1230 | " | 46 | " | " | " |
| Ex. 8 | 700 | 7.0 | " | $4.6\times10^4$ | 40 | " | " | 1.0/1.0 |
| Ex. 9 | 870 | 6.0 | 1530 | $5.8\times10^4$ | " | " | " | 0.9/0.9 |

What we claim is:

1. A glass bead-filled resin composition comprising
(I) a thermoplastic polyurethane derived from polybutylene terephthalate and a polyfunctional isocyanate,
(II) glass beads having a diameter of not more than 100 microns, and
(III) an aminosilane or epoxysilane.

2. A composition according to claim 1 which comprises 100 parts by weight of the thermoplastic polyurethane (I), 10 to 200 parts by weight of the glass beads (II) and 0.001 to 3% by weight, based on the weight of the glass beads, of the aminosilane or epoxysilane (III).

3. A composition according to claim 1 wherein the polybutylene terephthalate is hydroxyl-terminated and has an intrinsic viscosity of 0.2 to 0.6.

4. A composition according to claim 1 wherein said polyfunctional isocyanate is a diisocyanate of the general formula

OCN—R—NCO wherein R represents a divalent aromatic, aliphatic or alicyclic radical.

5. A composition according to claim 1 wherein the aminosilane or epoxysilane is a liquid compound of the general formula $R_1$—Si—X wherein $R_1$ represents a group having at least one amino or epoxy group, and X represents a hydroxyl group or a group convertible to a hydroxyl group upon reaction with water.

6. A composition according to claim 1 wherein the glass beads are coated with 0.001 to 3% by weight, based on the weight of the glass beads, of the aminosilane or epoxysilane.

7. A process for preparing a glass bead-filled resin composition which comprises kneading under heat (I) a thermoplastic polyurethane derived from polybutylene terephthalate and a polyfunctional isocyanate, and (II) glass beads having a diameter of not more than 100 microns and coated with (III) an aminosilane or epoxysilane.

8. A process for preparing a glass bead-filled resin composition which comprises reacting polybutylene terephthalate with a polyfunctional isocyanate in the presence of glass beads having a diameter of not more than 100 microns and coated with an aminosilane or epoxysilane.

9. A molded article produced from a glass bead-filled resin composition of any one of claims 1 to 6.

* * * * *